(12) United States Patent
Shinkai et al.

(10) Patent No.: US 6,383,722 B1
(45) Date of Patent: May 7, 2002

(54) METHOD FOR MAKING OPTICAL RECORDING MEDIUM AND OPTICAL RECORDING MEDIUM

(75) Inventors: Masahiro Shinkai; Atsushi Monden, both of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/320,509

(22) Filed: May 26, 1999

(30) Foreign Application Priority Data

May 27, 1998 (JP) .......................................... 10-162940

(51) Int. Cl.$^7$ ................................................ B41M 5/26
(52) U.S. Cl. .................. 430/321; 430/945; 430/270.15; 430/270.18; 430/270.19; 430/270.2; 430/270.21; 427/162
(58) Field of Search ................................ 430/945, 321, 430/270.15, 270.19, 270.21, 270.18, 18, 270.2; 427/162

(56) References Cited

U.S. PATENT DOCUMENTS

| | | | | |
|---|---|---|---|---|
| 4,994,343 A | * | 2/1991 | Inagaki et al. | 430/945 |
| 5,161,150 A | | 11/1992 | Namba et al. | 369/275.4 |
| 5,182,186 A | * | 1/1993 | Inagaki et al. | 430/945 |
| 5,274,623 A | * | 12/1993 | Usami et al. | 430/945 |
| 5,858,613 A | * | 1/1999 | Monden et al. | 430/270.19 |
| 6,060,606 A | * | 5/2000 | Misawa et al. | 548/405 |

FOREIGN PATENT DOCUMENTS

| | | | |
|---|---|---|---|
| JP | 01-049684 | * | 2/1989 |
| JP | 4-8585 | | 1/1992 |
| JP | 4-332930 | | 11/1992 |
| JP | 4-337538 | | 11/1992 |
| JP | 05-114178 | * | 5/1993 |
| JP | 5-225619 | | 9/1993 |

* cited by examiner

*Primary Examiner*—Martin Angebranndt
(74) *Attorney, Agent, or Firm*—Oblon, Spivak, McClelland, Maier & Neustadt, P.C.

(57) ABSTRACT

An object of the invention is to provide a method for preparing an optical recording medium, featuring a high production yield, a reduced loss and a high utilization of dye solution, and ensuring to produce media of consistent quality even by continuous coating as well as an optical recording medium. The object is achieved by a method for preparing an optical recording medium, comprising the step of applying a solution of a dye in a solvent onto a resin substrate to form a dye film, wherein the solvent of the dye solution is a mixture of tetrafluoropropanol and/or octafluoropentanol with an aliphatic saturated alcohol of 1 to 4 carbon atoms, and a recording layer is formed by applying the dye solution.

38 Claims, 1 Drawing Sheet

METHOD FOR MAKING OPTICAL RECORDING MEDIUM AND OPTICAL RECORDING MEDIUM

BACKGROUND OF THE INVENTION

1. Technical Field

This invention relates to a method for preparing an optical recording medium by applying a dye solution to form a dye film, and an optical recording medium.

2. Background Art

In recent years, various optical recording discs of the write-once, rewritable and other types draw attention as high capacity information carrying media.

Among the optical recording discs, there are known those having a dye film composed mainly of a dye as the recording layer. From a structural aspect, optical recording discs proposed thus far include widespread discs of the air-sandwich structure having an air space on a dye film and discs having a recording layer made of a dye film which can be read in accordance with the compact disc (CD) standard and a reflective layer disposed in close contact therewith. (See Nikkei Electronics, Jan. 23, 1989, No. 465, page 107; the Functional Dye Department of the Kinki Chemical Society, Mar. 3, 1989, Osaka Science & Technology Center; and Proceedings SPIE—The International Society for Optical Engineering, Vol. 1078, pages 80–87, "Optical Data Storage Topical Meeting", Jan. 17–19, 1989, Los Angels.)

The dyes used in such recording layers include cyanine dyes, phthalocyanine dyes, and azo metal dyes.

In general, recording layers are formed from these dyes by dissolving the dyes in organic solvents and applying the solutions by a spin coating technique. The spin coating technique is advantageous in that it is simple and does not require a large equipment. The spin coating technique, however, suffers from a low production yield. Since dyes are expensive, the low utilization of dyes causes the cost to increase due to a loss.

The requirement on the solvents of dye solutions is that dyes are fully soluble therein. In the prior art, keto-alcohol, ketone, alcohol, hydrocarbon, ester, ether, cellosolve, halogenated alkyl, and halogenated alcohol solvents are used. Among others, halogenated alcohols, especially fluorinated alcohols are advantageously used because of the high solubility of dyes therein.

In forming a dye film by coating, the utilization of a dye solution may be increased by reducing the discharge amount of the dye solution. However, if the discharge amount is below a certain level, the substrate surface is not fully covered with the solution, resulting in coating defects, for example, leaving an uncovered portion in a comb shape along the periphery of the optical recording disc. When spin coating is carried out using the above-mentioned solvents, the discharge amount must be increased in order to produce optical recording media of quality and free of such coating defects. This results in a substantial loss and low utilization of the dye solution. In the case of continuous coating, the discharge pressure at which the coating solution is discharged from a nozzle becomes high, resulting in variations of film thickness and occurrence of coating defects.

SUMMARY OF THE INVENTION

An object of the invention is to provide a method for preparing an optical recording medium, featuring a high production yield, a reduced loss and a high utilization of dye solution, and ensuring to produce media of consistent quality even by continuous coating as well as an optical recording medium.

Making extensive investigations to solve the above problems, the inventors have found that when a main solvent in which a dye is fully soluble is combined with a second solvent having a hydroxyl group (—OH group), the wetting of a substrate with the solution is improved so that the discharge amount of the dye solution can be reduced. The present invention is predicated on this finding.

The above and other objects are achieved by the present invention which is defined below.

(1) A method for preparing an optical recording medium, comprising the step of applying a solution of a dye in a solvent onto a resin substrate to form a dye film, wherein the solvent of said dye solution is a mixture of tetrafluoropropanol and/or octafluoropentanol with an aliphatic saturated alcohol of 1 to 4 carbon atoms, and a recording layer is formed by applying the dye solution.

(2) A method for preparing an optical recording medium according to (1) wherein the content of the aliphatic saturated alcohol is 0.5 to 40% by weight of said solvent.

(3) A method for preparing an optical recording medium according to (1) wherein said dye has a solubility of at least 0.3% by weight in tetrafluoropropanol and/or octafluoropentanol at 25° C.

(4) An optical recording medium prepared by the optical recording medium preparing method of (1).

DETAILED DESCRIPTION OF THE PREFERRED EMBODIMENTS

Figure 1:
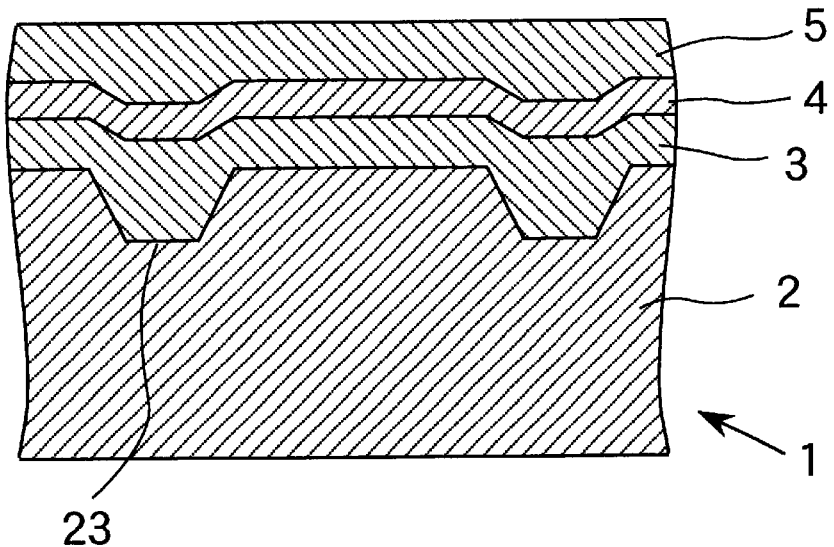
FIG. 1 is a fragmental cross-sectional view of an optical recording disc according to one embodiment of the invention.

The method for preparing an optical recording medium according to the invention involves the step of applying a solution of a dye in a solvent mixture of tetrafluoropropanol and/or octafluoropentanol and an aliphatic saturated alcohol of 1 to 4 carbon atoms onto a resin substrate to form a recording layer.

In the solvent mixture of the dye solution used herein, tetrafluoropropanol and/or octafluoropentanol is a main solvent. These are commonly used solvents. As described above, despite the high solubility of dyes, these solvents have the problem that when used alone, the utilization of dye solution is low.

By adding a low molecular weight second solvent having an —OH group to the main solvent, the surface tension of the solution is reduced and the wetting of a substrate with the solution is improved while maintaining the high solubility of a dye. Even when the discharge amount of the dye solution is reduced, the substrate surface can be fully and uniformly covered with the solution, leaving no coating defects. This results in an increased utilization of the dye and hence, a reduced cost.

Also, when the solvent mixture is used, continuous coating can be carried out without filter clogging and an increase of discharge pressure, so that the variation of coating thickness is minimized. That is, in the case of continuous coating, discs of high quality can be consistently produced while the amount of the dye used is reduced from the prior art.

In the spin coating step, the dye solution can be discharged at a low discharge pressure and the nozzle used can be thin, with the advantage that the amount of the dye solution used can be reduced.

It is already known to use a mixture of two or more solvents as the solvent of a dye solution.

In connection with a write-once CD having a ROM region, JP-A 4-337538 discloses a method for preparing an optical recording medium comprising the step of spin coating a solution of a dye in a solvent mixture of a fluorinated alcohol (2,2,3,3-tetrafluoropropanol) and 2-methoxyethanol, to thereby form a recording layer. It is described that the dye layer can be formed without a need to separately coat the ROM region and the write-once region. However, this solvent mixture is likely to induce crystallization and difficult to continuously apply. Only an extremely slight improvement is made in the utilization of the dye solution.

Also, JP-A 4-332930 discloses a method for preparing an optical recording medium comprising the step of applying a solution of a dye in a solvent mixture of a solvent which does not substantially dissolve the resin substrate and another solvent which dissolves the resin substrate, to thereby form a recording layer. However, since the other solvent which dissolves the substrate is used, the formation of a recording layer using this solvent mixture has a likelihood to dissolve the substrate. As a general rule, if the substrate is dissolved, even slightly, in the solvent, the resulting recording medium contains more noise portions and cause more errors.

The illustrative construction of the invention is described in detail.

The dye used herein is not critical insofar as it has a solubility of at least 0.3% by weight, preferably 0.3 to 8% by weight in tetrafluoropropanol and/or octafluoropentanol at 25° C. Illustrative examples of the dye include cyanine dyes, phthalocyanine dyes, azo metal complex dyes, formazan dyes, Rhodamine dyes, azo dyes, and triphenylmethane dyes. Of these, the cyanine dyes and phthalocyanine dyes are preferably used, and the preferred cyanine dyes are indolenine cyanine dyes. The indolenine cyanine dyes are preferably mixed with metal complex quenchers. The preferred phthalocyanine dyes used are the compounds described in EP 675489. The preferred dyes used for CD-R are pentamethine indolenine cyanine dyes and phthalocyanine dyes. The preferred dyes used for DVD-R are trimethine indolenine cyanine dyes. Of the indolenine cyanine dyes, those combined with quenchers in the form of a Ni or Cu dithiolene metal complex anion or azo metal complex anion as a counter ion are also useful. Azo metal complex dyes are also preferable. Examples of the azo metal complex dyes include those described in Japanese Patent Application Nos. 8-28646, 8-166885, 8-204340, 9-21016, and 2-68966. It is preferable to use the azo metal complex dyes for DVD-R.

These dyes may be used alone or in admixture of two or more.

The quenchers include amine dyes, dithiobenzyl metal complexes, and benzene dithiol metal complexes. The quenchers may be used in admixture with the above-mentioned dyes or as a counter ion to the above-mentioned dyes.

The organic solvent used as the solvent of the dye coating solution in the practice of the invention is a mixture of 2,2,3,3-tetrafluoro-1-propanol (TFP) and/or 2,2,3,3,4,4,5,5-octafluoro-1-pentanol (OFP) and an aliphatic saturated alcohol of 1 to 4 carbon atoms. TFP and OFP may be admixed in any desired ratio.

The aliphatic saturated alcohols have 1 to 4 carbon atoms. The carbon chain of the aliphatic saturated alcohol may be branched.

Illustrative examples of the aliphatic saturated alcohol include methanol, ethanol, 1-propanol, 2-propanol, butanol, and 2-butanol, and a proper choice may be made among them. Methanol, ethanol, 1-propanol and 2-propanol are especially preferred. The aliphatic saturated alcohols may be used in admixture of two or more.

Tetrafluoropropanol and/or octafluoropentanol and the aliphatic saturated alcohol are preferably mixed such that the content of the aliphatic saturated alcohol is 0.5 to 40% by weight and more preferably 1 to 30% by weight of the solvent mixture. Contents above 40% by weight tend to exacerbate the solubility of the dye and cause the dye to crystallize. With contents below 0.5% by weight, it would be difficult to reduce the discharge amount of the dye solution.

The spin coating technique is as usual. The coating is dried while the number of revolutions is controlled if necessary. A number of revolutions not greater than 1,500 rpm is preferable when the dye solution is discharged. The recording layer thus formed has a thickness which is properly determined in accordance with the desired reflectance and is usually in the range of about 1,000 to 3,000 angstroms (100 to 300 nm). After spin coating, a step of drying at 80° C. or lower may be undertaken.

In the coating solution, the dye content is preferably 0.3 to 10% by weight, and more preferably 0.4 to 5% by weight. Where two or more dyes are used, the total content of dyes may fall in the above range.

The coating solution may further contain a binder, dispersant, stabilizer and the like, if desired.

FIG. 1 illustrates one exemplary optical recording disc having such a dye film as a recording layer on a substrate. FIG. 1 is a cross-sectional view of a portion of the disc.

The optical recording disc 1 shown in FIG. 1 is a close contact type optical recording disc having a reflective layer in close contact with a recording layer and capable of reading operation complying with the CD standard. As shown in the figure, the optical recording disc 1 has a recording layer 3 containing the dye as a main component on a surface of a substrate 2, and a reflective layer 4 and a protective layer 5 in close contact with the recording layer 3.

The substrate 2 is in a disc form and, to enable write and read from the back surface of the substrate 2, is preferably formed of a resin or glass material which is substantially transparent (and preferably has a transmittance of at least 88%) to writing and reading light (having a wavelength of about 600 to about 900 nm, and typically about 630 to about 790 nm). With respect to dimensions, the disc has a diameter of about 64 to 200 mm and a thickness of about 0.6 to 1.2 mm.

On the surface of the substrate 2 where the recording layer 3 is to be formed, a groove 23 is formed for tracking purposes as shown in FIG. 1. The groove 23 is preferably a spiral continuous groove, preferably having a depth of 0.08 to 0.25 $\mu$m, a width of 0.20 to 0.60 $\mu$m, and a groove-to-groove pitch of 0.7 to 1.7 $\mu$m. With this construction of the groove, satisfactory tracking signals are obtainable without reducing the reflection level in the groove. It is especially important to control the groove width. With a groove width of less than 0.20 $\mu$m, it is difficult to obtain tracking signals of sufficient magnitude and a slight tracking offset during writing operation can cause an increased jitter. With a large groove width, waveform distortion is likely to occur. These groove parameters may be determined as appropriate in accordance with the wavelength of a laser for writing and reading operation.

The substrate 2 is preferably formed of resins, typically thermoplastic resins such as polycarbonate resins, acrylic resins, amorphous polyolefins, TPX, and polystyrene resins. Using these resins, the substrate can be prepared by well-known techniques such as injection molding. Preferably, the groove 23 should be formed simultaneously with the molding of the substrate 2. Alternatively, a resin layer having the groove may be formed by 2P or other methods after the fabrication of the substrate 2. Also, a glass substrate is useful as the case may be.

The recording layer 3 may be formed by a conventional spin coating technique as described above. The thickness of the recording layer is preferably 1,000 to 3,000 angstroms (100 to 300 nm), and more preferably 1,300 to 3,000 angstroms (130 to 300 nm) in dry thickness. Outside the range, satisfactory reading operation is restrained because of a lower reflectance.

The recording layer 3 thus formed should preferably have a coefficient of extinction k (imaginary part of a complex index of refraction) of 0.02 to 0.2 at the wavelength of recording and reading light. With k less than 0.02, the absorptivity of the recording layer becomes too low for writing with ordinary writing power. With k greater than 0.2, the reflectance becomes very low, obstructing satisfactory reading operation. Further, the recording layer 3 should preferably have an index of refraction n (real part of a complex index of refraction) of 1.8 to 2.6. With n less than 1.8, there is a tendency that the reflectance becomes low and read signals become weak, obstructing satisfactory reading operation. No upper limit is imposed on n although it is usually about 2.6 for convenience of synthesis of dye compounds and other reasons.

In determining n and k of a recording layer, a sample is prepared by forming a recording layer on a given transparent substrate to a thickness of about 40 nm to about 100 nm under practical conditions. Then, the reflectance of the sample is measured either through the substrate or from the recording layer side. Reflectance is measured in a specular reflection mode (of the order of 5°) using light of the write/read light wavelength. The transmittance of the sample is also measured. The values of n and k may be calculated from these measurements according to Ishiguro Kozo, "Optics", Kyoritsu Publishing K.K., pp. 168–178.

As can be seen from FIG. 1, the reflective layer 4 is provided on the recording layer 3 in direct contact relation thereto. Preferably, the reflective layer 4 is formed of a high-reflectance metal or alloy such as Au, Ag and Al or their alloy. The reflective layer 4 has preferably a thickness of at least 500 Å (50 nm), and may be formed as by evaporation or sputtering. The upper limit of thickness is not critical, although it is preferably about 1,200 Å (120 nm) or less when cost, production time and other factors are taken into account. The reflective layer 4 itself has thus a reflectance of at least 90%; so the reflectance of an unrecorded area of the optical recording disk through the substrate can be fully high.

As can be seen from FIG. 1, the protective layer 5 is formed on the reflective layer 4. The protective layer 5 is formed of various resin materials such as UV curable resins, for instance, and usually to a thickness of about 0.5 μm to about 100 μm. The protective layer 5 may be in a layer or sheet form. The protective layer 5 may be formed by conventional processes such as spin coating, gravure coating, spray coating and dipping.

Figure 2:
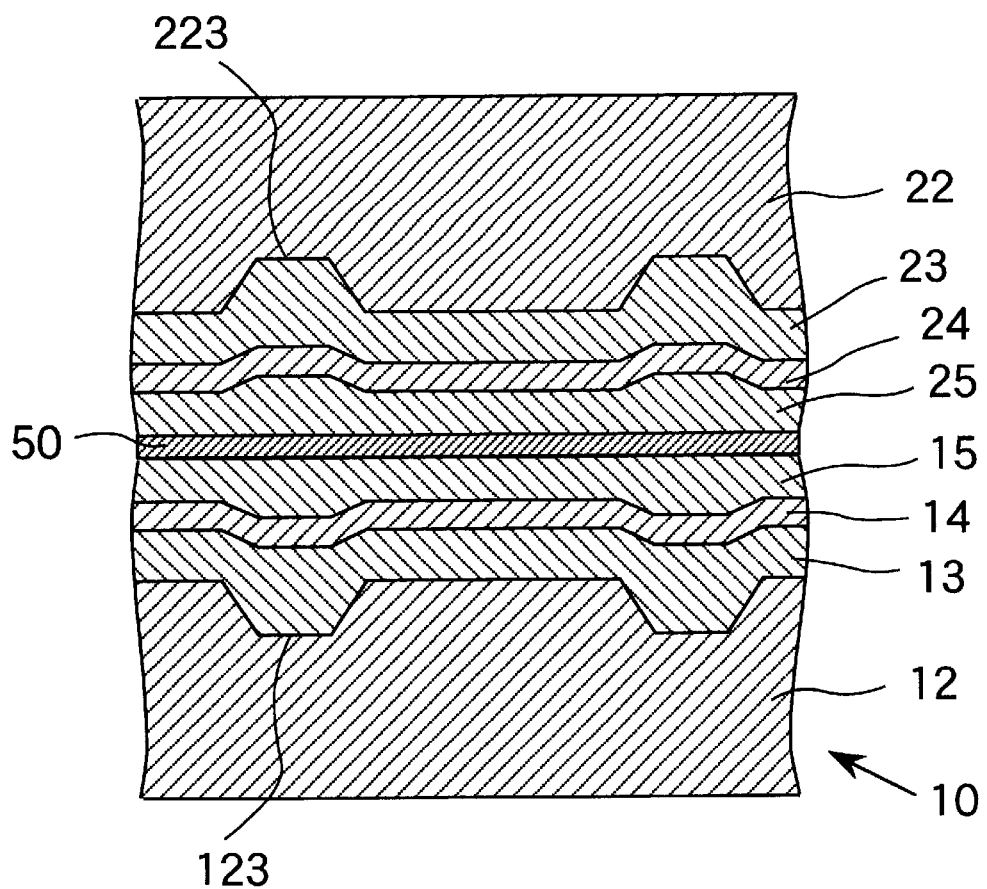
FIG. 2 is a fragmental cross-sectional view of an optical recording disc according to another embodiment of the invention.

A double side disc may be fabricated by joining two discs as shown in FIG. 2. One exemplary construction of the optical recording disc is shown in FIG. 2. FIG. 2 is a fragmental cross-sectional view.

The optical recording disc 10 shown in FIG. 2 is an optical recording disc complying with the digital video disc (DVD) standard, which is obtained by adhesively joining two discs of the same structure as the optical recording disc 1, with their protective films 15 and 25 faced each other. The adhesive used herein may be a thermosetting resin or the like, and an adhesive layer 50 has a thickness of about 10 to 200 μm. The substrates each have a thickness of about 0.6 mm. On one substrate 12 having a groove 123 formed therein, a recording layer 13, a reflective layer 14 and a protective film 15 as in FIG. 1 are successively formed. On another substrate 22 having a groove 223 formed therein, a recording layer 23, a reflective layer 24 and a protective film 25 are similarly formed. They are then joined together as mentioned above.

The substrates accord with that of the optical recording disc 1 described in conjunction with FIG. 1, and their groove has a depth of 600 to 2,000 Å (60 to 200 nm), a width of 0.2 to 0.5 μm, and a pitch of 0.6 to 1.0 μm.

The recording layer has a thickness of 500 to 3,000 Å (100 to 300 nm) and its complex index of refraction at 635 nm consists of n=1.8 to 2.6 and k=0.02 to 0.20.

Recording or additional writing may be carried out on the optical recording disc 1 of such construction (complying with the CD standard) by directing recording light having a wavelength of 780 nm, for example, in pulse form to the recording layer 3 through the substrate 2 to form an irradiated spot where optical reflectance is changed. Upon irradiation of recording light, the recording layer 3 absorbs light so that it is heated while the substrate 2 is heated at the same time. As a result, the materials of the recording layer such as the dye melt or decompose in the vicinity of the interface between the substrate 2 and the recording layer 3, probably applying pressure to that interface to deform the bottom and side walls of the groove.

Recording or additional writing may be carried out on the optical recording disc 10 (complying with the DVD standard) by writing with a short wavelength of about 635 nm and reading with a wavelength of about 650 nm.

The optical recording media of the invention are not limited to optical recording discs of the close contact type like the illustrated embodiments and may be any discs insofar as they have a dye-containing recording layer. One example is pit formation type optical recording discs of the air sandwich structure, and equivalent results are obtained when the present invention is applied thereto.

EXAMPLE

Examples of the invention are given below by way of illustration.

EXAMPLES

A coating solution was prepared by dissolving Dyes 1 to 12 (shown below) in a solvent mixture of 2,2,3,3-tetrafluoro-1-propanol (TFP) or 2,2,3,3,4,4,5,5-octafluoro-1-pentanol (OFP) and an aliphatic saturated alcohol as shown in Table 1. The dye content of the coating solution was 1.5% by weight when TFP was used and 2.5% by weight when OFP was used.

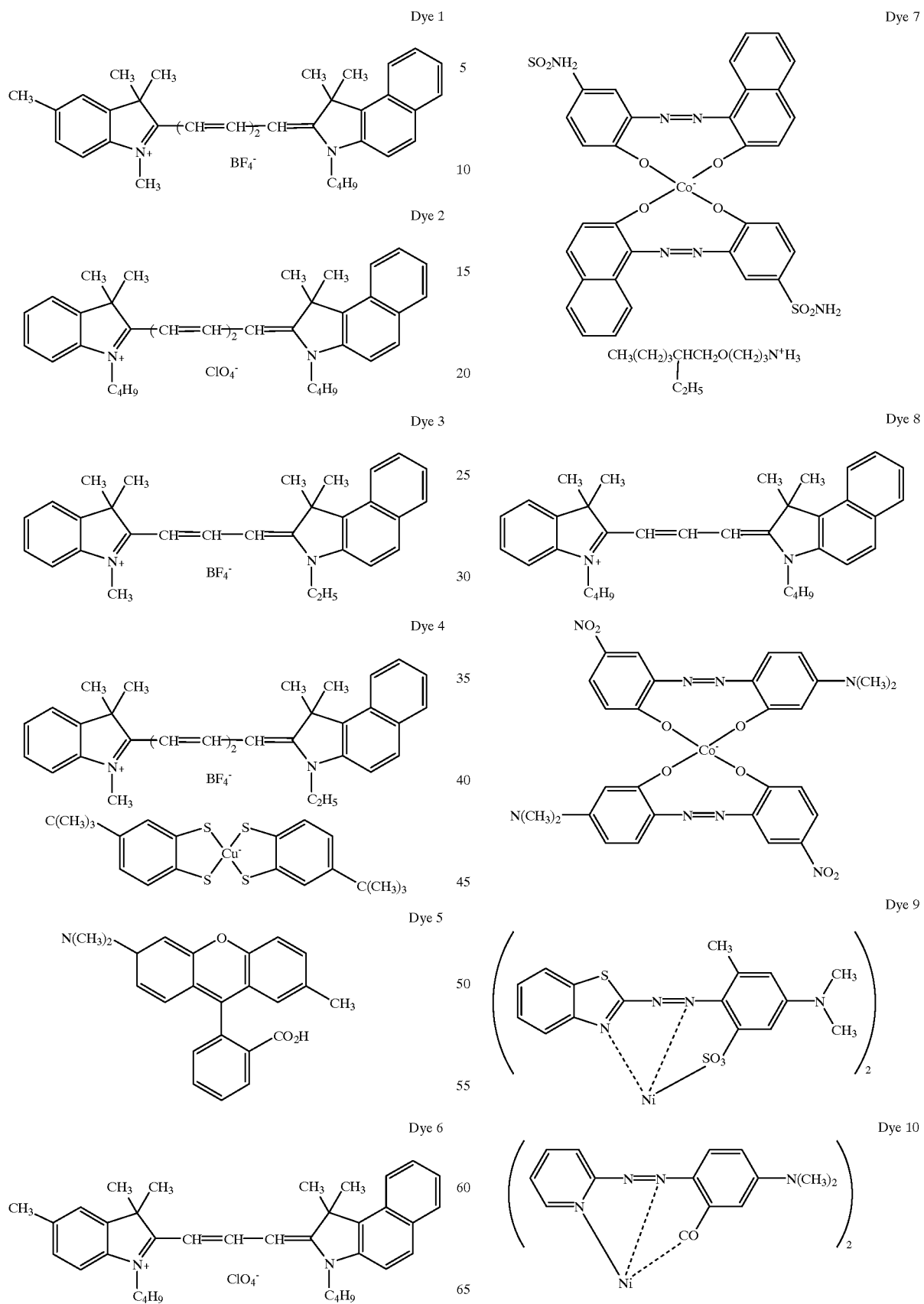

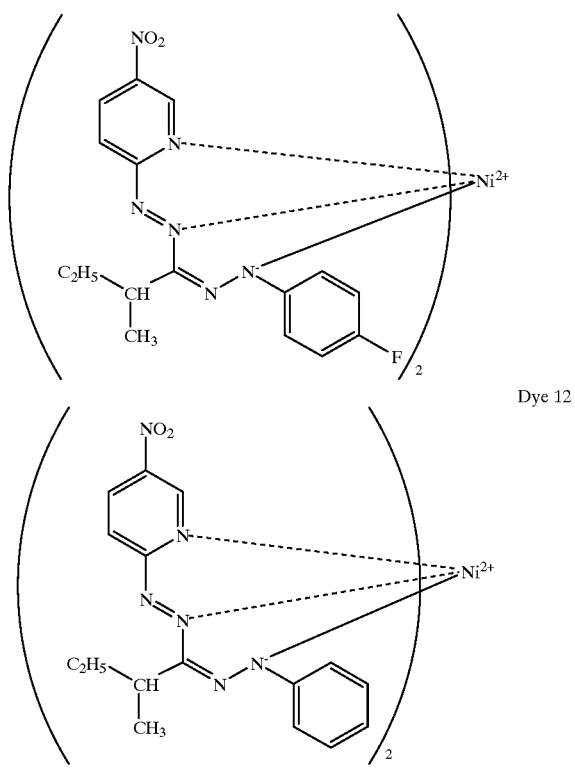

By a spin coating technique, the coating solution was applied onto a polycarbonate resin substrate of 120 mm in diameter and 1.2 mm thick and dried to form a dye layer of 1,800 Å (180 nm) thick. For spin coating, a nozzle having an inside diameter of 0.25 mm and a discharge pressure of 0.6 kgf/cm² were used.

Coating was continuously carried out on 1,000 discs. Neither filter clogging nor discharge pressure rise occurred.

The average amount of the dye solution used per disc was calculated from the overall amount of the solution used and the number of coated discs (=1,000). The results are shown in Table 1.

It was also examined how the film thickness changed on 1,000 discs. The results are also shown in Table 1.

Next, an Au reflective layer was formed on the dye layer to a thickness of 100 nm by sputtering. Further, a UV-curing type acrylic resin was built up thereon to a thickness of 5 μm by spin coating and cured by light exposure, to thereby form a protective film, completing an optical recording disc (see FIG. 1).

The optical recording discs fabricated in this way were evaluated by means of DDU-1000 by Pulse Tech K.K. As a result, the optical recording disc of Example 1 had a recording sensitivity of 6.0 mW, a reflectance of 69%, and a modulation of 75%, indicating satisfactory performance. The remaining discs were equivalent.

Comparative Example 1

An optical recording disc was fabricated by forming the dye layer as in Examples except that Dye 1 was used as the dye, and the solvent of the coating solution was 100% TFP. It was evaluated as in Examples. The results are shown in Table 1.

Comparative Example 2

An optical recording disc was fabricated by forming the dye layer as in Examples except that Dye 1 was used as the dye, and the solvent of the coating solution was a mixture of TFP and methyl cellosolve in a weight ratio of 95:5. It was evaluated as in Examples. The results are shown in Table 1.

The use of this solvent invited filter clogging and a rise of discharge pressure, which caused a variation of film thickness and left uncovered portions. Continuous coating became prohibited at 350 discs. The average amount of the dye solution used per disc was greater than in Examples.

Comparative Example 3

An optical recording disc was fabricated by forming the dye layer as in Examples except that Dye 1 was used as the dye, and the solvent of the coating solution was a mixture of TFP and ethyl cellosolve in a weight ratio of 93:7. It was evaluated as in Examples. The results are shown in Table 1.

The use of this solvent invited filter clogging and a rise of discharge pressure, which caused a variation of film thickness and left uncovered portions. Continuous coating became prohibited at 500 discs. The average amount of the dye solution used per disc was greater than in Examples.

Benefits of the Invention

In a method for preparing an optical recording medium, the invention is successful in improving a production yield,

TABLE 1

| | Dye (molar ratio) | Solvent (weight ratio) | Discharge amount (g) | Filter clogging | Film thickness variation | Disc performance |
|---|---|---|---|---|---|---|
| E1 | Dye 1 | TFP:2-propanol = 95:5 | 0.30 | no | <3% | Good |
| E2 | Dye 2:Dye 11 = 85:15 | TFP:methanol = 98:2 | 0.30 | no | <3% | Good |
| E3 | Dye 1:Dye 12 = 90:10 | TFP:1-propanol = 98:2 | 0.28 | no | <3% | Good |
| E4 | Dye 3 | TFP:ethanol = 80:20 | 0.29 | no | <3% | Good |
| E5 | Dye 1:Dye 4 = 70:30 | TFP:1-propanol = 90:10 | 0.27 | no | <3% | Good |
| E6 | Dye 3:Dye 5:Dye 7 = 50:30:20 | TFP:2-propanol = 95:5 | 0.30 | no | <3% | Good |
| E7 | Dye 8:Dye 6 = 90:10 | OFP:2-propanol = 90:10 | 0.32 | no | <3% | Good |
| E8 | Dye 6:Dye 7 = 70:30 | OFP:2-propanol = 98:2 | 0.34 | no | <3% | Good |
| E9 | Dye 9 | OFP:butanol = 93:7 | 0.33 | no | <3% | Good |
| E10 | Dye 10:Dye 3 = 90:10 | OFP:butanol = 85:15 | 0.35 | no | <3% | Good |
| CE1 | Dye 1 | TFP | 0.45 | clogged* | — | — |
| CE2 | Dye 1 | TFP:methyl cellosolve = 95:5 | 0.50 | clogged* | — | — |
| CE3 | Dye 1 | TFP:ethyl | 0.50 | clogged* | — | — |

*at 100 discs or less reducing a loss of dye solution, and achieving a cost reduction. No problems of filter clogging etc. occur even upon continuous coating. Products having a minimized variation of film thickness and of consistent quality are obtained.

What is claimed is:

1. A method for preparing an optical recording medium, comprising:

a) applying a solution of a dye in a solvent onto a resin substrate to form a dye film, wherein said solvent of said dye solution comprises a mixture of octafluoropentanol with 1- or 2-propanol, the solvent comprising 0.5 to 40% by weight of said 1- or 2-propanol; and b) drying to form a recording layer from the dye film.

2. The method of claim 1, wherein said dye has a solubility in octafluoropentanol of at least 0.3% by wt. at 25° C.

3. The method of claim 2, wherein said dye is selected from the group consisting of cyanine dyes, phthalocyanine dyes, azo metal complex dyes, formazan dyes, Rhodamine dyes, azo dyes and triphenylmethane dyes.

4. The method of claim 3, wherein said dye is selected from the group consisting of azo metal complex dyes, cyanine dyes and phthalocyanine dyes.

5. The method of claim 4, wherein said dye is a cyanine dye, which is an indolenine cyanine dye.

6. The method of claim 5, wherein said indolenine cyanine dye is mixed with a metal complex quencher.

7. The method of claim 6, wherein said metal complex quencher comprises Ni- or Cu-dithiolene metal complex anions or azo metal complex anions.

8. The method of claim 4, wherein said dye is selected from the group consisting of pentamethine indolenine cyanine dyes and phthalocyanine dyes.

9. The method of claim 4, wherein said dye is selected from the group consisting of trimethine indolenine cyanine dyes.

10. The method of claim 4, wherein said dye is an azo metal complex dye.

11. The method of claim 1, wherein said solvent comprises 1 to 30% by weight of the 1- or 2-propanol.

12. The method of claim 1, wherein said solution of said dye in said solvent comprises said dye in an amount of 0.3 to 10% by wt.

13. The method of claim 1, wherein said dye solution is applied onto said resin substrate by spin coating.

14. The method of claim 1, wherein said resin substrate is in a disk form.

15. The method of claim 1, wherein said resin substrate comprises a groove on a surface thereof on which the recording layer is formed.

16. The method of claim 15, wherein said groove is a spiral continuous groove having a depth of 0.08 to 0.25 μm, a width of 0.20 to 0.60 μm, and a groove-to-groove pitch of 0.7 to 1.7 μm.

17. The method of claim 1, wherein said formed recording layer has a dry thickness of 100 to 300 nm.

18. The method of claim 1, which further comprises after step b), forming a reflective layer on said recording layer.

19. The method of claim 18, which further comprises after forming said reflective layer, forming a protective layer on said reflective layer.

20. A method of preparing an optical recording medium, comprising:

a) applying a solution of a dye in a solvent onto a resin substrate to form a dye film, wherein said solvent of said dye solution is a mixture comprising tetrafluoropropanol and 1- or 2-propanol, said tetrafluoropropanol and said 1- or 2-propanol being in a ratio of from 98:2 to 80:20; and b) drying to form a recording layer from said dye film.

21. The method of claim 20, wherein said dye has a solubility in tetrafluoropropanol of at least 0.3% by wt. at 25° C.

22. The method of claim 21, wherein said dye is selected from the group consisting of cyanine dyes, phthalocyanine dyes, azo metal complex dyes, formazan dyes, Rhodamine dyes, azo dyes and triphenylmethane dyes.

23. The method of claim 22, wherein said dye is selected from the group consisting of azo metal complex dyes, cyanine dyes and phthalocyanine dyes.

24. The method of claim 23, wherein said dye is a cyanine dye, which is an indolenine cyanine dye.

25. The method of claim 24, wherein said indolenine cyanine dye is mixed with metal complex quencher.

26. The method of claim 25, wherein said metal complex quencher comprises Ni- or Cu-dithiolene metal complex anions or azo metal complex anions.

27. The method of claim 23, wherein said dye is selected from the group consisting of pentamethine indolenine cyanine dyes and phthalocyanine dyes.

28. The method of claim 23, wherein said dye is selected from the group consisting of trimethine indolenine cyanine dyes.

29. The method of claim 23, wherein said dye is an azo metal complex dye.

30. The method of claim 20, wherein said solvent comprises 1 to 30% by weight of the 1- or 2-propanol.

31. The method of claim 20, wherein said solution of said dye in said solvent comprises said dye in an amount of 0.3 to 10% by wt.

32. The method of claim 20, wherein said dye solution is applied onto said resin substrate by spin coating.

33. The method of claim 20, wherein said resin substrate is in a disk form.

34. The method of claim 20, wherein said resin substrate comprises a groove on a surface thereof on which the recording layer is formed.

35. The method of claim 34, wherein said groove is a spiral continuous groove having a depth of 0.08 to 0.25 μm, a width of 0.20 to 0.60 μm, and a groove-to-groove pitch of 0.7 to 1.7 μm.

36. The method of claim 20, wherein said formed recording layer has a dry thickness of 100 to 300 nm.

37. The method of claim 20, which further comprises after step b), forming a reflective layer on said recording layer.

38. The method of claim 37, which further comprises after forming said reflective layer, forming a protective layer on said reflective layer.

* * * * *